US009021710B2

(12) United States Patent
Silberberg

(10) Patent No.: US 9,021,710 B2
(45) Date of Patent: May 5, 2015

(54) BUBBLE LEVEL

(76) Inventor: Mark L. Silberberg, Fallbrook, CA (US)

( * ) Notice: Subject to any disclaimer, the term of this patent is extended or adjusted under 35 U.S.C. 154(b) by 315 days.

(21) Appl. No.: 13/528,623

(22) Filed: Jun. 20, 2012

(65) Prior Publication Data

US 2013/0340270 A1 Dec. 26, 2013

(51) Int. Cl.
*G01C 9/24* (2006.01)
*G01C 9/28* (2006.01)

(52) U.S. Cl.
CPC .................................... *G01C 9/28* (2013.01)

(58) Field of Classification Search
CPC .............. G01C 9/24; G01C 9/26; G01C 9/28; G01C 9/34
USPC ........... 33/347, 350, 370, 371, 372, 373, 376, 33/379, 381
See application file for complete search history.

(56) References Cited

U.S. PATENT DOCUMENTS

| | | | | |
|---|---|---|---|---|
| 1,523,932 | A * | 1/1925 | Davies | 411/393 |
| 2,635,350 | A * | 4/1953 | Bettega | 33/381 |
| 2,748,494 | A * | 6/1956 | Raney | 33/383 |
| D301,553 | S | 6/1989 | Makofsky et al. | |
| D332,226 | S | 1/1993 | Hutchins et al. | |
| D355,134 | S | 2/1995 | Kennedy | |
| D371,309 | S | 7/1996 | Webb | |
| D389,758 | S | 1/1998 | Motamed | |
| 5,743,691 | A * | 4/1998 | Donovan | 411/180 |
| 5,749,152 | A * | 5/1998 | Goss et al. | 33/381 |
| D395,013 | S | 6/1998 | Webb | |
| D409,100 | S | 5/1999 | Brimer | |
| D411,470 | S | 6/1999 | Webb | |
| D509,158 | S * | 9/2005 | Silberberg | D10/69 |
| D538,186 | S | 3/2007 | Silberberg | |
| D539,679 | S | 4/2007 | Silberberg | |
| D613,194 | S | 4/2010 | Silberberg | |
| 7,802,372 | B1 * | 9/2010 | Silberberg | 33/451 |
| 7,946,045 | B2 | 5/2011 | Allemand | |
| 7,975,393 | B2 * | 7/2011 | Sparrow | 33/348 |
| 8,061,051 | B2 | 11/2011 | Allemand | |
| 2006/0107541 | A1 * | 5/2006 | Godinez | 33/371 |
| 2010/0131015 | A1 * | 5/2010 | Kozak | 606/301 |
| 2011/0119941 | A1 * | 5/2011 | Steele et al. | 33/379 |
| 2012/0151785 | A1 * | 6/2012 | Lettkeman et al. | 33/301 |

* cited by examiner

*Primary Examiner* — R. A. Smith
(74) *Attorney, Agent, or Firm* — James E. Brunton

(57) ABSTRACT

A bubble type level for determining the orientation of a structure that includes a plurality of differently oriented bubble vials that are secured within the level body in a manner such that, if any one of the bubble vials become broken or otherwise damaged, it can be easily replaced and the level need not be discarded. The bubble type level of the invention also includes a novel connector mechanism that enables the level to be removably interconnected with the structure to be leveled. The level further includes a plurality of longitudinally spaced magnets that are connected to the bottom surface of the level and a bulls-eye level that is mounted on the top surface of the level body.

10 Claims, 2 Drawing Sheets

90°
45°
30°

14
16
18
20
22
24
26
28
32
34
36
37
38
40
42

BUBBLE LEVEL

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to tools used in the construction industry. More particularly, the invention concerns a specially designed bubble level having replaceable bubble vials and including a novel connector mechanism for releasably connecting the level to the structure to be leveled.

2. Description of Related Art Including Information Disclosed Under 37 CRF 1.97 and 1.98

Bubble levels of various designs have been suggested in the past and are widely used by construction workers to determine the orientation of a particular structure or surface with respect to a reference axis. A typical bubble level generally comprises an elongated body that has a pair of opposing, generally parallel working surfaces and includes a plurality of openings having bubble vials permanently secured therein. The bubble vials are typically aligned in different directions relative to the working surfaces and function to indicate the orientation of a structure. For example, one vial may be aligned in a direction perpendicular to the working surfaces, another may be aligned in a direction parallel to the working surfaces and a third may be aligned in an angular direction. Typically, the vial contains a fluid and a bubble, and the user views the position of the bubble within the vial to determine the position of the tool relative to the working surfaces.

A novel and highly useful level construction is disclosed in U.S. Pat. No. 7,802,372 issued to the present inventor. This patent, which is entitled "Removable Laser Base Attachment for Bubble Levels", describes a bubble level that includes a body, a laser beam generator, and a removable securement. The body has a flat top surface that the level is secured to and a bottom surface that is flat and parallel to the top surface. A laser diode mounted in a module emits a visible laser beam upon application of power from a battery that is controlled by a switch. The module, batteries, and switch are mounted in a through bore in the body. The laser base is removably secured to the bubble level by any manner appropriate to the shape of the level. In one such securement, the level has a T-shaped cross-section and the body has a complementary slot into which the level slides. When the level reference surface abuts the top surface of the laser base, a thumb screw is tightened to frictionally secure the level in the base.

BRIEF SUMMARY OF THE INVENTION

It is an object of the present invention to provide a bubble type level for determining the orientation of a structure that includes a plurality of differently oriented bubble vials that are secured within the level body in a manner such that, if any one of the bubble vials become broken, or otherwise damaged, it can be easily replaced and the level need not be discarded.

Another object of the invention to provide a bubble type level of the afore mentioned character in which the bubble vials are securely held in position within threaded chambers formed in the level body by easily removable threaded cap screws.

Another object of the invention to provide a bubble type level of the character described which includes a novel connector mechanism that enables the level to be removably interconnected with the structure to be leveled. In one form of the invention the connector mechanism is provided in the form of a conventional, self-contained ball-and-spring device that is threadably connected to the level body proximate one end thereof.

Still another object of the invention to provide a bubble type level of the class described that includes a plurality of longitudinally spaced magnets that are connected to the bottom surface of the level so as to permit the level to be conveniently, removably connected to any ferrous structure that is being leveled.

Yet another object of the invention to provide a bubble type level of the type described in the preceding paragraphs that includes a bulls-eye level that is mounted on the top surface of the level body proximate the center of the level.

These and other objects of the invention will be realized by the level construction illustrated in the drawings and described in the paragraphs that follow.

DETAILED DESCRIPTION OF THE INVENTION

Figures 1, 2, 3, 4, 5:
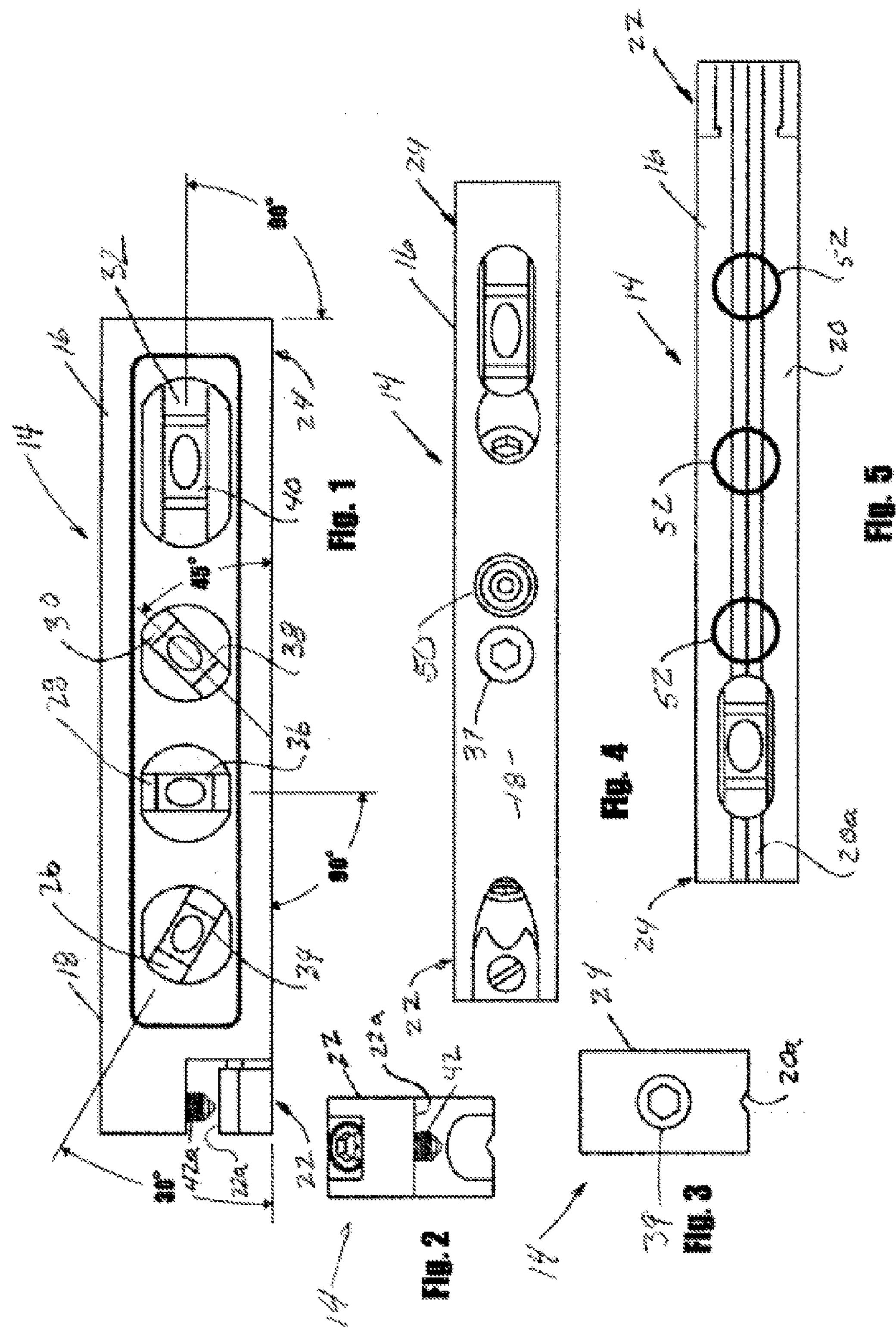
FIG. 1 is a side elevational view of one form of the leveling device of the invention.
FIG. 2 is a right end view of the leveling device shown in FIG. 1.
FIG. 3 is a left end view of the leveling device shown in FIG. 1.
FIG. 4 is a top plan view of the leveling device shown in FIG. 1.
FIG. 5 is a bottom plan view of the leveling device shown in FIG. 1.

Referring to the drawings and particularly to FIGS. 1 through 6, one form of the level of the invention for determining the orientation of a structure is there shown and generally designated by the numeral 14. Level 14 here comprises an elongate body 16 having a top surface 18, a bottom surface 20 and first and second end portions 22 and 24, respectively. For a purpose presently to be discussed, first end portion 22 is provided with a slot 22*a*. As best seen in FIGS. 3 and 5, bottom surface 20 is provided with a longitudinally extending, generally "V" shaped groove 20*a*.

Figures 6, 7, 8:
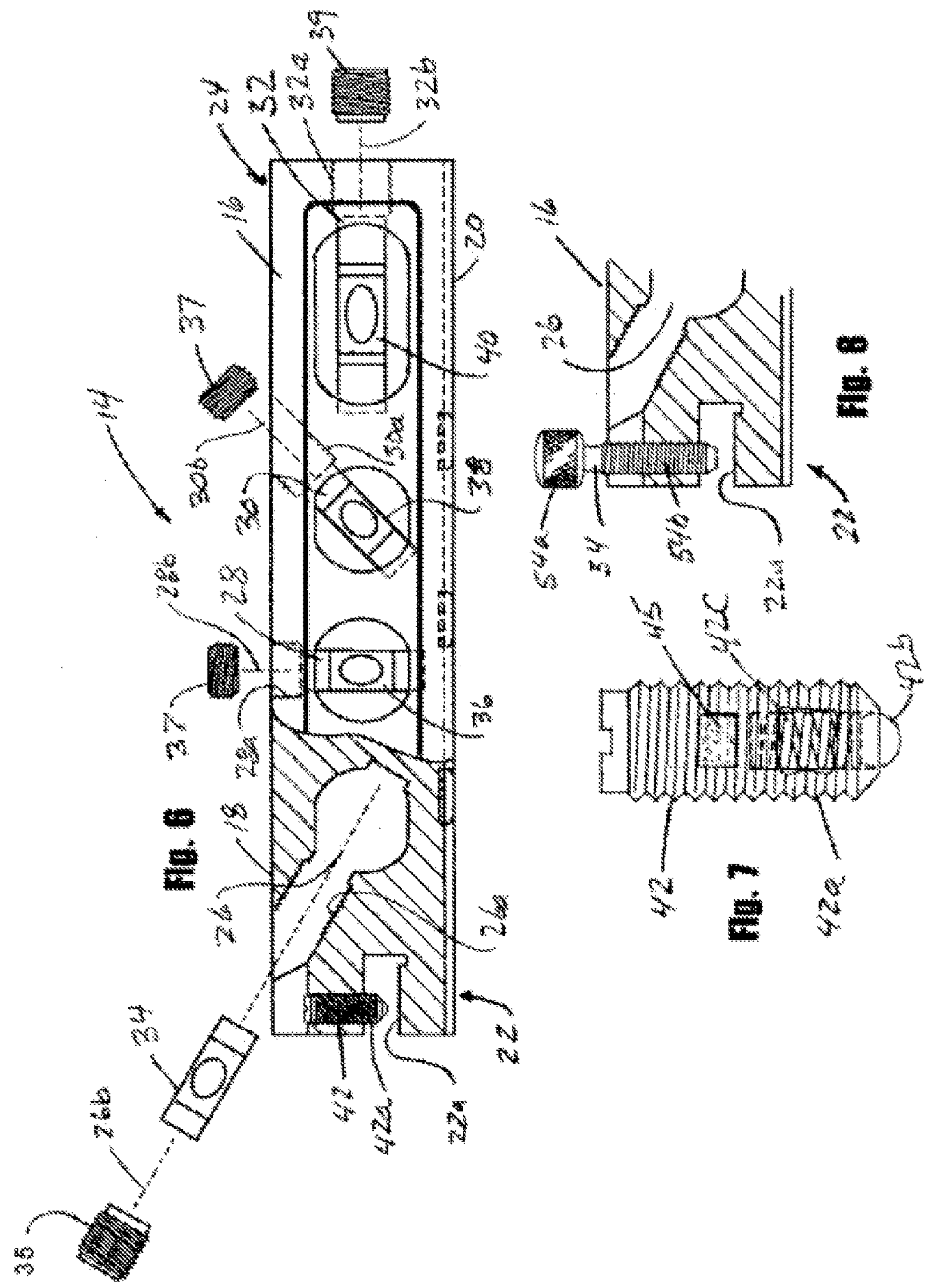
FIG. 6 is a side elevational, exploded view partially in cross-section of the leveling device of the invention.
FIG. 7 is a greatly enlarged, side elevational view of the spring-ball-screw component of the leveling device of the invention.
FIG. 8 is a fragmentary, cross-sectional view of the right end portion of an alternate form of the leveling device of the invention.

As best seen in FIGS. 1 and 6 of the drawings, body 16 has a plurality of differently oriented vial chambers 26, 28, 30 and 32. Vial chamber 26 has a threaded end portion 26*a* and a central axis 26*b* that is disposed at an angle of approximately 38 degrees with respect to bottom surface 20. Vial chamber 28 has a threaded end portion 28*a* and a central axis 28*b* that is disposed at an angle of approximately 90 degrees with respect to bottom surface 20. Vial chamber 30 has a threaded end portion 30*a* and a central axis 30*b* that is disposed at an angle of approximately 45 degrees with respect to bottom surface 20. Vial chamber 32 has a threaded end portion 32*a* and a central axis 32*b* that is disposed in a generally parallel relationship with bottom surface 20. It is to be understood that the angles of the axes of the central axis of each of the vial chambers can vary depending upon the end use of the improved level.

A conventional bubble vial 34 is disposed within vial chamber 26 and is uniquely removably secured there within by a threaded connector that is threadably receivable within threaded opening 26*a* of vial chamber 26. The threaded connector, which is here provided in the form of a conventional cap screw 35 (FIG. 6), is moveable between first and second positions to secure the bubble vial 34 within vial chamber 26 (FIG. 1). A conventional bubble vial 36 is disposed within vial chamber 28 and is uniquely removably secured there within by a threaded connector that is threadably receivable within threaded opening 28*a* of vial chamber 28. The threaded connector, which is also here provided in the form of a conventional cap screw (FIGS. 3 and 6), is moveable between first and second positions to secure the bubble vial 36 within vial chamber 28 (FIG. 1). In similar manner, a conventional bubble vial 38 is disposed within vial chamber 30 and is uniquely removably secured there within by a threaded connector that is threadably receivable within threaded opening 30*a* of vial chamber 30. Once again, the threaded connector is provided in the form of a conventional cap screw 37 (FIGS. 3 and 6) that is moveable between first and second positions to secure the bubble vial 38 within vial chamber 30 (FIG. 1).

In like manner, as shown in FIG. 1, a conventional bubble vial 40 is disposed within vial chamber 32 and is removably secured there within by a conventional cap screw 39 (FIG. 6) which is moveable between first and second positions to secure the bubble vial 40 within vial chamber 32.

With the construction thus described, any one of the bubble vials of the level can be conveniently removed and replaced by simply removing the threaded cap screw from the threaded end portion of the vial chamber and then by removing the bubble vial from its chamber. Unlike the prior art levels, if a given bubble vial is broken or otherwise damaged, it can be easily replaced and the level need not be discarded.

Another highly important feature of the present invention resides in the provision of a connector mechanism for releasably interconnecting body 16 with the structure to be leveled. The connector mechanism, which is here provided in the form of a conventional, self-contained ball-and-spring device 42, is threadably connected to body 16 proximate first end portion 22. As depicted in FIG. 7, the self-contained ball-and-spring device 42 has a threaded shank portion 42*a* that, when the device is threadably connected to the level body, at least partially extends into slot 22*a* of the first end portion of the body (FIG. 6). Ball-and-spring device 42 also includes a ball 42*b* and a biasing spring 42*c* that are arranged in the manner illustrated in FIG. 7. As depicted in FIG. 6, ball 42*b* is carried by threaded shank portion 42*a* and resides within slot 22*a*.

As illustrated in FIG. 7, shank portion 42*a* of the ball-and-spring device 42 includes a nylon patch 45 that functions to prevent the device from accidentally moving within threaded portion 47 of the end portion 22 due to vibration.

Self-contained ball-and-spring devices 42, which are suitable for the present purpose, are readily commercially available from several sources including the Carr Lane Manufacturing Co. of St. Louis, Mo.

Turning now to FIG. 4 of the drawings, another important feature of the present invention resides in the provision of a bulls-eye level 50 that is mounted on the top surface 18 of body 16 proximate the center of the level. Bulls-eye level 50 is readily commercially available from several sources including the Johnson Level & Tool Mfg. Co., Inc. of Mequon, Wis.

Referring to FIG. 5, still another important feature of the present invention resides in the provision of a plurality of longitudinally spaced magnets 52 that are connected to the bottom surface 20 of body 16. In use, these magnets permit the level to be conveniently, removably connected to any ferrous structure that is being leveled. Magnets 52 are readily commercially available from several sources including Applied Magnets of Plano, Tex.

Turning now to FIG. 8, an alternate form of connector mechanism for releasably interconnecting body 16 with the structure to be leveled is there shown. This alternate form of connector mechanism is provided in the form of a conventional screw 54 that has a knurled head 54*a* and threaded shank portion 54*b*. When the device is threadably connected to the level body 16 in the manner shown in FIG. 8, threaded shank portion 54*b* at least partially extends into slot 22*a* of the first end portion of body 16.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

The invention claimed is:

1. A level for determining the orientation of a structure comprising:

(a) a body having first and second end portions, said first end portion having a slot and including a vial chamber having a threaded opening;

(b) a bubble vial disposed within said vial chamber;

(c) a threaded connector receivable within said threaded opening of said vial chamber for movement from a first position to a second position in engagement with said bubble vial to secure said bubble vial within said vial chamber; and (d) a connector mechanism threadably connected to said body proximate said first end portion for releasably interconnecting said body with the structure, said connector mechanism comprising a shank portion extending into said slot and a ball carried by said shank portion.

2. The level as defined in claim 1 in which said threaded connector comprises a cap screw.

3. The level as defined in claim 1 in which said connector mechanism further includes a nylon patch.

4. A level for determining the orientation of a structure comprising:

(a) a body having first and second end portions, said first end portion having a slot, a top surface and a bottom surface and including a plurality of vial chambers, each said vial chamber having a threaded opening;

(b) a bubble vial disposed within each of said vial chambers of said body;

(c) a threaded connector receivable within said threaded opening of each of said vial chambers for movement between first and second positions to secure said bubble vials within said vial chambers; and (d) a connector mechanism connected to said body portion proximate said first end thereof for releasably interconnecting said body with the structure, said connector mechanism comprising:

(i) a shank portion extending into said slot of said first end portion of said body;

(ii) a ball carried by said shank portion; and (iii) a nylon patch.

5. The level as defined in claim 4 in which at least one of said vial chambers is disposed at an angle with respect to said top surface of said body.

6. The level as defined in claim 4 in which at least one of said vial chambers is disposed in a parallel relationship with said top surface of said body.

7. The level as defined in claim 4 further including at least one magnet connected to said bottom surface of said body.

8. The level as defined in claim 4 further including a bulls-eye level connected to said top surface of said body.

9. A level for determining the orientation of a structure comprising:

(a) a body having a top surface, a bottom surface and first and second end portions, said first end portion having a slot, said body having a plurality of vial chambers, each said vial chamber having a threaded opening;

(b) a bubble vial disposed within each of said vial chambers of said body;

(c) a threaded connector receivable within said threaded opening of each of said vial chambers for movement between first and second positions to secure said bubble vials within said vial chambers;

(d) a connector mechanism connected to said body proximate said first end portion thereof for releasably interconnecting said body with the structure, said connector mechanism comprising a device having a shank portion at least partially extending into said slot of said first end portion of said body; a ball carried by said shank portion; and a nylon patch carried by said shank portion; and (e) at least one magnet connected to said bottom surface of said body.

10. The level as defined in claim 9 further including a bulls-eye level connected to said top surface of said body.

* * * * *